United States Patent [19]

Sakschek

[11] 4,389,175

[45] Jun. 21, 1983

[54] APPARATUS FOR DISTRIBUTING DRY FIBERS ONTO A FORMING WIRE

[75] Inventor: Helmut W. Sakschek, Neenah, Wis.

[73] Assignee: James River-Dixie/Northern, Inc., Greenwich, Conn.

[21] Appl. No.: 263,908

[22] Filed: May 15, 1981

[51] Int. Cl.[3] .......................... B29J 5/00; D04H 17/00

[52] U.S. Cl. .................................... 425/82.1; 264/115; 425/83.1

[58] Field of Search ..................... 425/82.1, 80.1, 83.1; 264/115

[56] References Cited

U.S. PATENT DOCUMENTS

| | | | |
|---|---|---|---|
| 1,901,352 | 3/1933 | McCarthy | 425/80.1 |
| 1,970,742 | 8/1934 | Gerard et al. | 425/82.1 X |
| 2,230,880 | 2/1941 | Brown | 425/83.1 |
| 2,336,745 | 12/1943 | Manning . | |
| 2,550,354 | 4/1951 | Jacobsen | 425/82.1 X |
| 2,698,271 | 12/1954 | Clark . | |
| 2,720,005 | 10/1955 | Clark et al. . | |
| 2,728,939 | 1/1956 | Behr | 425/83.1 X |
| 2,738,557 | 3/1956 | Anderson et al. . | |
| 2,746,096 | 5/1956 | Baxter et al. | 425/80.1 |
| 2,825,388 | 3/1958 | Hale et al. | 264/115 X |
| 3,016,582 | 1/1962 | Joa | 425/82.1 X |
| 3,050,427 | 8/1962 | Slayter et al. | 425/82.1 X |
| 3,332,114 | 7/1967 | Oja . | |
| 3,482,287 | 12/1969 | Flewwelling . | |
| 3,824,652 | 7/1974 | Buell | 425/82.1 |
| 3,984,898 | 10/1976 | Matsumura et al. | 425/82.1 X |
| 4,014,635 | 3/1977 | Kroyer | 425/83.1 X |
| 4,030,865 | 6/1977 | Kobayashi | 425/82.1 |
| 4,144,619 | 3/1979 | White et al. . | |
| 4,169,699 | 10/1979 | Werner . | |

*Primary Examiner*—Philip E. Anderson

*Attorney, Agent, or Firm*—William A. Aguele; Harry W. Hargis, III; Joseph J. Brindisi

[57] ABSTRACT

A distributor for receiving an air suspension of fibers and uniformly spreading them over a moving forming wire. Upper and lower parallel rotors in the distributor have parallel axes and rotor bars. The lower rotor is rotatable to distribute fibers through screen openings in a lower curved housing wall over the wire. The upper rotor bars pass in close proximity to a breaker bar extending into the distributor, and against which breaker bar clumps of fibers too large to pass through the screen openings are impacted and broken down into individual fibers capable of passing through the screen openings.

19 Claims, 3 Drawing Figures

APPARATUS FOR DISTRIBUTING DRY FIBERS ONTO A FORMING WIRE

BACKGROUND OF THE INVENTION

This invention relates to apparatus for depositing dry fibers from an air suspension thereof onto a moving forming wire to form a fibrous web, such as paper.

Apparatus for depositing dry fibers generally takes the form of a distributor housing having a screen over an opening facing a forming wire, and an inlet opening for directing a suspension of fibers in air from a fiberizer into the housing for discharge through the screen onto the forming wire. A rotary impeller provided in the housing operates uniformly to distribute the fibers over the screen to ensure uniform passage through the screen and onto the forming wire. Invariably, fibers tend to agglomerate, forming clumps too large to pass through the screen, and detracting from optimum operation of the distributor. Prior art efforts at overcoming this problem have generally involved apparatus for removing clumps for recycling in the fiberizer, where they are reduced to their original, individual fiber makeup for return to the distributor. Apparatus for recycling requires additional conduits, air moving devices, and the like, which add to equipment, operational, and maintenance costs.

It is an objective of the invention to provide improved apparatus for removing clumps that does not require recycling apparatus of the hereinabove described type.

It is another objective of the invention to provide improved apparatus for removing clumps that is characterized by its simplicity of construction and effectiveness of operation.

SUMMARY OF THE INVENTION

In achievement of the foregoing as well as other general objectives, the invention contemplates an apparatus for depositing a uniform web of dry fibers on a unidirectionally movable forming wire, comprising: a fiber distributor housing including a pair of substantially vertically extending, planar side walls spaced one from the other in the direction of forming wire movement; upper and lower walls extending between respective upper and lower regions of said side walls, said upper and lower walls being of substantially semi-cylindrical shape, and having their concave sides facing one another; end walls extending between said recited upper, lower, and side walls to close said housing; said lower wall having apertures defining an outlet screen disposed above said forming wire; conduit means for air-entrained fiber having an opening communicating with an opening provided in the region of juncture of said vertical side wall and said upper wall on the side of said housing opposite the direction of forming wire movement; at least first and second rotors having axes of rotation substantially parallel to the axes of curvature of said upper and lower walls, and each said rotor including a plurality of substantially equally angularly spaced rotor bars substantially parallel to said axes and unidirectionally movable in circular paths in close proximity to said lower and upper walls, respectively; and a breaker bar extending substantially parallel to and at the level of the axis of said second rotor, said breaker bar further projecting into said housing, on the side thereof opposite said opening, and in close proximity to a rotor bar as it moves therepast upon rotation of said second rotor.

The manner in which the objectives and advantages of the invention may best be achieved will be more fully understood from the following description, taken in light of the accompanying drawing.

DESCRIPTION OF THE PREFERRED EMBODIMENT

Figure 1:
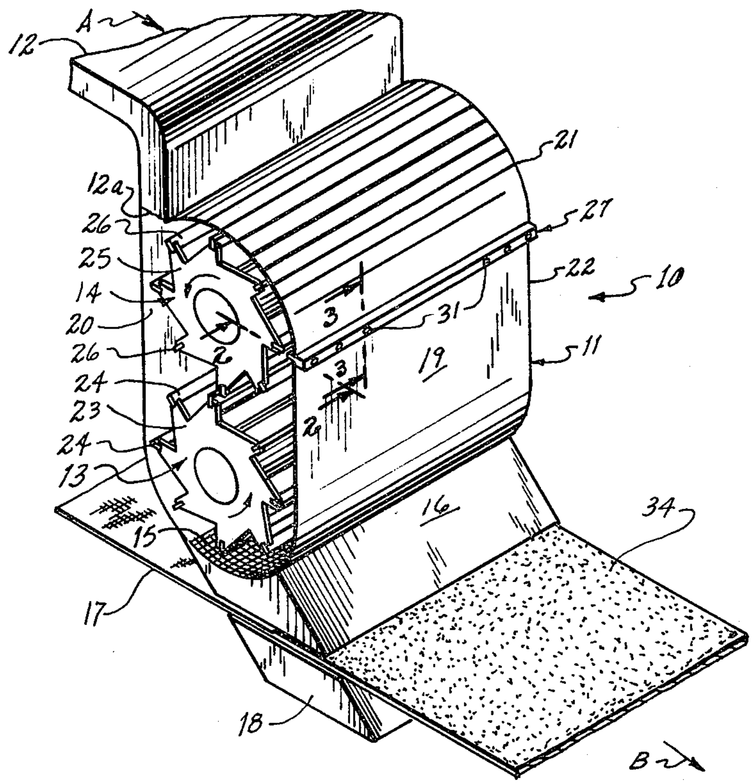
FIG. 1 is a perspective showing, with a part removed, of fiber distributor apparatus embodying the invention.

With more detailed reference to the drawing, there is seen in FIG. 1 an apparatus 10 comprising a dry fiber distributor housing 11 having an inlet duct means 12 provided with an opening **12*a* for introducing a dispersion of dry fibers in air, or other suitable gaseous medium, moving in the direction of arrow A. The introduced fibers are uniformly distributed by a pair of rotors 13 and 14 within the housing, and over a lower wall, including an outlet screen 15, formed as a section of a hollow cylinder. The screen 15, which may be of mesh or of metal provided with apertures, is directly beneath rotor 13 and extends over the opening of an angularly extending duct or nozzle 16 positioned to direct fibers at an angle onto a forming wire 17 so that they have a horizontal component of velocity nearly that of the forming wire moving in the direction of arrow B. A suction box 18 of conventional construction is positioned beneath forming wire 17, so that its opening is in substantial alignment with the outlet opening of duct 16**.

Further to the structure of housing 11, front and rear substantially vertically extending walls 19 and 20 thereof are connected at their upper regions by an upper wall 21 formed as a section of a hollow cylinder. Accordingly, wall 20 and opening **12*a* are upstream and wall 19 is downstream as respects the direction of travel of forming wire 17. The axes of curvature of screen 15 and wall 21, and the axes of rotation of rotors 13 and 14 are substantially parallel. A pair of side walls, the nearer one of which has been removed for convenience of illustration, and the other designated generally by the numeral 22**, extend between the other walls to complete the housing.

Rotors 13 and 14 are rotatable independently of one another in the same direction, by suitable drive means (not shown). Rotor 13, also termed a forming rotor, includes a pair of axially spaced hubs, one of which is seen at 23. Each hub is provided with circumferentially equally spaced arms that support rotor bars 24 substantially parallel to one another and to the axis of rotation of rotor 13. Rotor 14, termed also a spreading rotor, includes a pair of axially spaced hubs, one of which is seen at 25. Each of the latter hubs is provided with circumferentially equally spaced arms that support rotor bars 26 in substantial parallelism to one another and to rotor bars 24. Construction and arrangement of rotors 13 and 14 is such that they rotate freely, independently of one another, within housing 11, with bars 24 and 26 passing one another with clearance. Independent, non-meshed rotation is preferred, in the event it is desired to operate the rotors at different speeds.

Figure 2:
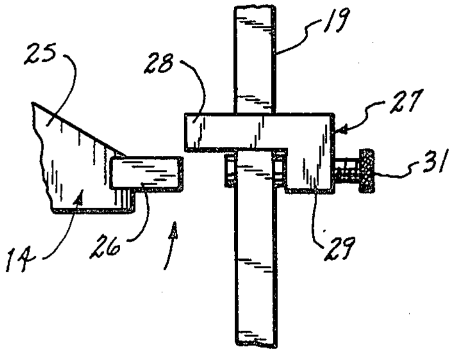
FIG. 2 is an enlarged elevational showing of the apparatus as seen looking in the direction of arrows 2—2 applied to FIG. 1.
Figure 3:
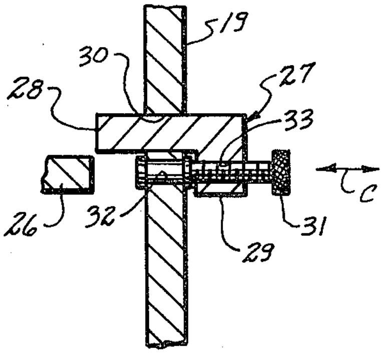
FIG. 3 is a sectional showing, on an enlarged scale, taken along the line 3—3 in FIG. 1, and looking in the direction of arrows applied thereto.

In especial accordance with the invention, and with reference also to FIGS. 2 and 3, a breaker bar device 27 comprises a substantially horizontally extending bar 28 projecting through a slotted opening 30 in wall 19, and a base portion 29 depending from the bar. For reasons to be more fully appreciated from what follows, and with particular reference to FIG. 3, bar 28 is disposed substantially at the level of the axis of spreading rotor 14, and is selectively adjustable (see arrows C) through opening 39, toward and away from the travel path of rotor bars 26. Adjustability is conveniently afforded by a series of screws 31, each retained for free rotation in an opening 32 in wall 19 and threaded through an opening 33 in base portion 29.

In operation of apparatus 10, forming wire 17 is driven in the direction of arrow B, while gas or air entrained fibers are introduced, as indicated by arrow A, to distributor housing 11 through inlet duct 12. Simultaneously with movements thus far described, rotors 13 and 14 are driven according to the directional arrows applied thereto. As the fibers are introduced to housing 11 through duct 12, the tangential, downward movement of rotor bars 24 and 26 adjacent vertical wall 20 drive the fibers downwardly as they enter through opening 12*a*, whereupon the circular movements of rotor bars 24 of the forming rotor 13 sweep the fibers over the screen 15 for passage therethrough to duct 16, and, under the influence of suction box 18, onto forming wire 17 in the formation of a fibrous web 34 of substantially uniform thickness and basis weight.

As is the case in the air or dry laying of fibers, there is a tendency to the formation or agglomoration of fibers into clumps that do not pass through screen 15. These clumps, along with fibers of proper consistency that do not traverse or pass through screen 15, continue to flow upwardly, under the influence of the tangentially upwardly driven rotor bars 24 and 26 as they move past vertical wall 19 of housing 11.

Advantageously, and in especial accordance with the invention, the clumps are opened up by the combination of turbulence and impacting of breaker bar 28 by the clumps, as rotor bars 26 of the spreading rotor pass the breaker bar. Fibers from the opened or broken up clumps are then caused by spreading rotor 14 to flow along curved upper wall 21, whereupon they join the newly introduced fibers entering housing 11 through duct opening 12*a* for spreading and passage through screen 15.

It is to be appreciated that the improved apparatus requires no recycling of fiber clumps outside the distributor housing once they have been introduced. Any clumps in housing 11 are continuously acted upon by the spreading rotor and the breaker bar until they are broken down into fibers of a size sufficient to pass through screen 15 along with fibers of proper size or consistency. Insofar as the rotational speeds of the rotors are concerned, they should be so interrelated that fiber clumps will be flung by the lower forming rotor 13 upwardly for impingement by the upper spreading rotor 14 in its nip with breaker bar 28. The breaker bar, by virtue of its adjustability, advantageously is capable of being "tuned" to the type or extent of fiber agglomeration encountered in operation of the apparatus.

It also to be appreciated that some variations in proportions and disposition of elements as well as operating characteristics of elements of the preferred embodiment may be resorted to. An example of one such variation would be affording a slight inclination to one or both walls 19 and 20 in provision of relative convergence of the walls toward the screen 15. In such event, the upper rotor 14 would be of greater diameter than the lower rotor 13. Another variation might be the addition of one or more rotors to the generally vertical array, with or without addition of corresponding breaker bars of the type seen at 27. In the event increased shearing action between the rotor bars and a breaker bar is desirable, the rotor bars may be of helical configuration, while extending substantially parallel to the rotor axis. As to operating characteristics, the rotors may be rotated at the same, or at different speeds, and if desired, in opposite directions relative to one another. In any such modification, and as is the case with the preferred embodiment, the apparatus will advantageously operate to spread and distribute the fibers, while a rotor and a corresponding breaker bar thereof will cooperate to break up any clumps of fibers forming in the course of operation.

While a preferred embodiment of the invention, as well as some contemplated variations thereof, have been described, it will be understood that these as well as other variations may be resorted to without departing from the scope of the appended claims.

I claim:

1. An apparatus for depositing a uniform web of dry fibers on a forming wire, comprising:
   - a fiber distributor housing having an inlet opening for introducing therein a gaseous dispersion of dry fibers, and a perforate outlet opening for discharging said fibers onto said forming wire;
   - at least a pair of rotors mounted to rotate in said housing, one rotor disposed above the other rotor, said rotors being cooperatively disposed upon rotation thereof to move said fibers about in said housing between said openings whereby to spread said fibers as they are introduced and to uniformly distribute said fibers over said perforate outlet opening for discharge therethrough onto said forming wire;
   - and means defining a breaker bar in said housing, adjacent one of said rotors, and being so shaped and disposed as to be impacted by clumps of fibers moved by said rotors and break them up by impaction into fibers within said housing, in accomodation of passage of said fibers through said perforate outlet opening.

2. Apparatus of claim 1, wherein said rotors are rotatable about substantially horizontal axes, and said housing is defined in part by a generally cylindrically shaped wall closely spaced from said one rotor, and said perforate outlet opening is defined by a generally cylindrically shaped screen closely spaced from said other rotor.

3. Apparatus of claim 2, wherein each said rotor comprises rotor bars substantially evenly spaced about their respective rotor axes, said rotor bars being of substantially parallel extent with respect to said axes.

4. Apparatus of claim 1, 2, or 3 wherein means is included for selectively adjusting said breaker bar toward or away from said rotor to which it is adjacent, to vary the space therebetween.

5. Apparatus of claim 1, 2, or 3 wherein said inlet opening for said housing is disposed to the side of said housing opposite said breaker bar, substantially at the level of said one rotor, and to the side of said housing which is upstream of the direction of travel of a forming wire.

6. Apparatus of claim 4 wherein said inlet opening for said housing is disposed to the side of said housing opposite said breaker bar, substantially at the level of said one rotor, and to the side of said housing which is upstream of the direction of travel of a forming wire.

7. An apparatus for depositing a uniform web of dry fibers on a forming wire, comprising:

a fiber distributor housing having an inlet opening for introducing therein a gaseous dispersion of dry fibers, and a perforate outlet opening for discharging said fibers onto said forming wire;

a pair of rotors in said housing, one rotor disposed above the other rotor, said one rotor being operative to spread fibers as they are introduced and said other rotor being operative to uniformly distribute dry fibers over said perforate outlet opening for discharge therethrough onto said forming wire, said pair of rotors being cooperatively disposed to move said fibers about in said housing between said openings;

and means defining a breaker bar in said housing, adjacent said one rotor, and being so shaped and disposed as to be impacted by clumps of fibers moved by said rotors and break them up into fibers within said housing, in accomodation of passage of said fibers through said perforate outlet opening.

8. Apparatus of claim 7, wherein said rotors are rotatable about substantially horizontal parallel axes, and said housing is defined in part by a generally cylindrically shaped wall closely spaced from said one rotor, and said perforate outlet opening is defined by a generally cylindrically shaped screen closely spaced from said other rotor.

9. Apparatus of claim 8, wherein each said rotor comprises rotor bars evenly spaced about their respective rotor axes and from one another, said rotor bars being substantially parallel to said axes.

10. Apparatus of claim 7, 8, or 9 wherein means is included for selectively adjusting said breaker bar toward or away from said rotor to which it is adjacent, to vary the space therebetween.

11. Apparatus of claim 7, 8, or 9 wherein said inlet opening for said housing is disposed to the side of said housing opposite said breaker bar, substantially at the level of said one rotor, and to the side of said housing which is upstream of the direction of travel of a forming wire.

12. Apparatus of claim 10 wherein said inlet opening for said housing is disposed to the side of said housing opposite said breaker bar, substantially at the level of said one rotor, and to the side of said housing which is upstream of the direction of travel of a forming wire.

13. An apparatus for depositing a uniform web of dry fibers on a unidirectionally movable forming wire, comprising:

a fiber distributor housing including a pair of substantially extending, planar side walls spaced one from the other in the direction of forming wire movement;

upper and lower walls extending between respective upper and lower regions of said side walls, said upper and lower walls being of substantially semicylindrical shape, and having their concave sides facing one another;

end walls extending between said recited upper, lower, and side walls to close said housing;

said lower wall having apertures defining an outlet screen disposed above said forming wire;

conduit means for air-entrained fiber having an opening communicating with an opening provided in the region of juncture of said vertical side wall and said upper wall on the side of said housing opposite the direction of forming wire movement;

at least first and second rotors having axes of rotation substantially parallel to the axes of curvature of said upper and lower walls, and each said rotor including a plurality of substantially equally angularly spaced rotor bars substantially parallel to said axes and unidirectionally movable in circular paths in close proximity to said lower and upper walls, respectively; and a breaker bar extending substantially parallel to and at the level of the axis of said second rotor, said breaker bar further projecting into said housing, on the side thereof opposite said opening, and in close proximity to a rotor bar as it moves therepast upon rotation of said second rotor.

14. Apparatus of claim 13, wherein said first and second rotors are rotatable at substantially the same speeds.

15. Apparatus of claim 13 or 14, wherein said breaker bar is mounted for selective adjustment toward and away from said second rotor.

16. Apparatus of claim 13, wherein said first and second rotors are rotatable at different speeds.

17. Apparatus of claim 13, 14, or 16 wherein said breaker bar is mounted for selective adjustment toward and away from said second rotor.

18. Apparatus of claim 15, wherein said selective adjustment is provided by screw means rotatable on said housing and threadedly engaging said breaker bar, selective rotation of said screw means being effective to move said breaker bar toward or away from said second rotor.

19. Apparatus of claim 17, wherein said selective adjustment is provided by screw means rotatable on said housing and threadedly engaging said breaker bar, selective rotation of said screw means being effective to move said breaker bar toward or away from said second rotor.

* * * * *